(12) United States Patent
Wu et al.

(10) Patent No.: US 11,330,154 B1
(45) Date of Patent: May 10, 2022

(54) AUTOMATED COORDINATION IN MULTIMEDIA CONTENT PRODUCTION

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 17/384,674

(22) Filed: Jul. 23, 2021

(51) Int. Cl.
| | |
|---|---|
| *H04N 5/222* | (2006.01) |
| *H04N 21/2343* | (2011.01) |
| *H04N 21/242* | (2011.01) |
| *G11B 27/031* | (2006.01) |

(52) U.S. Cl.
CPC ......... *H04N 5/2228* (2013.01); *G11B 27/031* (2013.01); *H04N 21/234309* (2013.01); *H04N 21/242* (2013.01)

(58) Field of Classification Search
CPC .................................................. H04N 5/2228
See application file for complete search history.

(56) References Cited

U.S. PATENT DOCUMENTS

| | | |
|---|---|---|
| 6,466,655 B1 | 10/2002 | Clark |
| 8,910,201 B1 | 12/2014 | Zamiska et al. |
| 9,106,812 B1 | 8/2015 | Price et al. |
| 10,721,377 B1 | 7/2020 | Wu et al. |
| 11,070,888 B1 | 7/2021 | Wu et al. |
| 11,107,503 B2 | 8/2021 | Wu et al. |
| 11,166,086 B1 | 11/2021 | Wu et al. |

(Continued)

FOREIGN PATENT DOCUMENTS

| | | |
|---|---|---|
| CA | 3038767 | 10/2019 |
| CN | 101316362 A | 12/2008 |

(Continued)

OTHER PUBLICATIONS

International Search Report and Written Opinion dated Mar. 10, 2020 in International Application No. PCT/CN2019/090722, 10 pages.

(Continued)

*Primary Examiner* — Hsiungfei Peng
(74) *Attorney, Agent, or Firm* — Perkins Coie LLP

(57) ABSTRACT

Methods, apparatus and systems related to automated production of multimedia contents are described. In one example aspect, an automated production system includes a directing server configured to store production-stage information in a machine-readable script and manage production of a multimedia content according to the script. The system also includes a device management server configured to coordinate one or more shooting locations for the production of the multimedia content. The device management server is configured to receive a portion of the production-stage information extracted from the script based on its location. The system further includes end devices connected to the device management server. The device management server is configured to track activities of the end devices and to provide status of the end devices at a production time to the directing server to enable the directing server to dynamically update the script for subsequent shooting activities at the production time.

28 Claims, 6 Drawing Sheets

(56) References Cited

U.S. PATENT DOCUMENTS

| | | |
|---|---|---|
| 2002/0099577 A1 | 7/2002 | Black |
| 2003/0061610 A1 | 3/2003 | Errico |
| 2006/0053041 A1 | 3/2006 | Sakai |
| 2006/0251382 A1 | 11/2006 | Vronay et al. |
| 2006/0282783 A1 | 12/2006 | Covell et al. |
| 2006/0282785 A1 | 12/2006 | McCarthy et al. |
| 2008/0010601 A1 | 1/2008 | Dachs |
| 2008/0028318 A1 | 1/2008 | Shikuma |
| 2008/0033801 A1 | 2/2008 | McKenna et al. |
| 2008/0036917 A1 | 2/2008 | Pascarella et al. |
| 2008/0101476 A1 | 5/2008 | Tian et al. |
| 2009/0063659 A1 | 3/2009 | Kazerouni et al. |
| 2011/0085025 A1 | 4/2011 | Pace et al. |
| 2011/0162002 A1 | 6/2011 | Jones et al. |
| 2011/0206351 A1 | 8/2011 | Givoly |
| 2011/0249953 A1 | 10/2011 | Suri et al. |
| 2012/0294589 A1 | 11/2012 | Samra et al. |
| 2013/0067333 A1 | 3/2013 | Brenneman |
| 2013/0124984 A1 | 5/2013 | Kuspa |
| 2013/0151970 A1 | 6/2013 | Achour |
| 2013/0166625 A1 | 6/2013 | Swaminathan et al. |
| 2013/0232178 A1 | 9/2013 | Katsambas |
| 2013/0290557 A1 | 10/2013 | Baratz |
| 2014/0082079 A1 | 3/2014 | Dunsmuir |
| 2014/0119428 A1 | 5/2014 | Catchpole et al. |
| 2014/0132841 A1 | 5/2014 | Beaulieu-Jones et al. |
| 2014/0133834 A1 | 5/2014 | Shannon |
| 2014/0328570 A1 | 11/2014 | Cheng et al. |
| 2015/0012325 A1 | 1/2015 | Maher |
| 2015/0043892 A1 | 2/2015 | Groman |
| 2015/0082349 A1 | 3/2015 | Ishtiaq et al. |
| 2015/0256858 A1 | 9/2015 | Xue |
| 2015/0261403 A1 | 9/2015 | Greenberg et al. |
| 2015/0281710 A1 | 10/2015 | Sievert et al. |
| 2015/0302893 A1 | 10/2015 | Shannon |
| 2015/0363718 A1 | 12/2015 | Boss et al. |
| 2015/0379358 A1 | 12/2015 | Renkis |
| 2016/0027198 A1 | 1/2016 | Terry et al. |
| 2016/0050465 A1 | 2/2016 | Zaheer et al. |
| 2016/0132546 A1 | 5/2016 | Keating |
| 2016/0292509 A1 | 10/2016 | Kaps et al. |
| 2016/0323483 A1* | 11/2016 | Brown .................. G11B 27/10 |
| 2017/0017644 A1 | 1/2017 | Accardo et al. |
| 2017/0048492 A1 | 2/2017 | Buford et al. |
| 2017/0169853 A1 | 6/2017 | Hu et al. |
| 2017/0178346 A1 | 6/2017 | Ferro et al. |
| 2017/0337912 A1 | 11/2017 | Caligor et al. |
| 2017/0358023 A1 | 12/2017 | Peterson |
| 2018/0005037 A1 | 1/2018 | Smith et al. |
| 2018/0213289 A1 | 7/2018 | Lee et al. |
| 2019/0045194 A1 | 2/2019 | Zavesky et al. |
| 2019/0058845 A1 | 2/2019 | MacDonald-King et al. |
| 2019/0155829 A1 | 5/2019 | Schriber et al. |
| 2019/0215540 A1 | 7/2019 | Nicol et al. |
| 2019/0356948 A1 | 11/2019 | Stojancic et al. |
| 2020/0081596 A1 | 3/2020 | Greenberg et al. |
| 2020/0168186 A1 | 5/2020 | Yamamoto |
| 2020/0312368 A1 | 10/2020 | Waterman |
| 2020/0396357 A1 | 12/2020 | Wu et al. |
| 2021/0011960 A1 | 1/2021 | Chambon-Cartier |
| 2021/0084085 A1* | 3/2021 | Jones .................. H04L 61/25 |
| 2021/0104260 A1 | 4/2021 | Wu et al. |
| 2021/0185222 A1* | 6/2021 | Zavesky ............ H04N 5/23225 |
| 2021/0211779 A1 | 7/2021 | Wu et al. |
| 2021/0350829 A1 | 11/2021 | Wu et al. |
| 2021/0398565 A1 | 12/2021 | Wu et al. |

FOREIGN PATENT DOCUMENTS

| | | |
|---|---|---|
| CN | 101365094 | 2/2009 |
| CN | 101960440 | 1/2011 |
| CN | 104581222 | 4/2015 |
| CN | 108447129 A | 8/2018 |
| CN | 109196371 | 1/2019 |
| CN | 109905732 | 6/2019 |
| JP | 2000101647 A | 4/2000 |
| WO | 2004105035 A1 | 12/2004 |
| WO | 2008156558 A1 | 12/2008 |
| WO | 2010068175 A2 | 6/2010 |

OTHER PUBLICATIONS

Davenport, Glorianna, et al., "Cinematic primitives for multimedia", MIT Media Laboratory, IEEE Computer graphics and Applications, pp. 67-74, Jul. 1991.

International Search Report and Written Opinion dated May 7, 2020 for International Application No. PCT/CN2019/099534, filed on Aug. 7, 2019 (9 pages).

International Search Report and Written Opinion dated May 27, 2020 for International Application No. PCT/CN2019/109919, filed on Oct. 8, 2019 (11 pages).

International Search Report and Written Opinion dated Aug. 7, 2020 for International Application No. PCT/US2020/032217, filed on May 8, 2020 (10 pages).

International Search Report and Written Opinion dated Jan. 3, 2022 for International Application No. PCT/US2021/047407, filed on Aug. 24, 2021 (20 pages).

P. Minardi and B. Alonso, "How Automation Can Help Broadcasters and Production Companies Reach Video Production Nirvana," SMPTE17: Embracing Connective Media, 2015, pp. 1-12, doi: 10.5594/M001738. (Year: 2015).

International Search Report and Written Opinion dated Feb. 28, 2022 for International Application No. PCT/US2021/056839, filed on Oct. 27, 2021 (16 pages).

Hua et al., "AVE—Automated Home Video Editing," Proceedings of the 11th ACM International Conference on Multimedia, MM '03, Berkeley, CA, Nov. 2-8, 2003.

USPTO Notice of Allowance for U.S. Appl. No. 17/549,749, dated Mar. 3, 2022 (14 pages).

* cited by examiner

AUTOMATED COORDINATION IN MULTIMEDIA CONTENT PRODUCTION

TECHNICAL FIELD

This patent document relates to automated coordination of equipment and personnel during the production stage of multimedia contents including audios, videos, or multimedia products that include moving images.

BACKGROUND

Producing multimedia contents can be a complex process that requires elaborate coordination of equipment and personnel of the crew. It can be difficult to synchronize various devices and collaboration between the crew at the production stage.

SUMMARY

The lack of synchronization various devices in production equipment and collaboration between the crew at the production stage may cause various production issues and wasted resources including, e.g., repetitive shooting of the same shot or scene and increasing cost for the production. There remains a need to improve the coordination of entities in the production stage of multimedia contents. Described herein are techniques, subsystems and systems to facilitate automated coordination in multimedia content production and to improve synchronization of operations of different production devices and actions of the production personnel. The disclosed techniques can be used to automatically coordinate equipment and personnel during production stage, thereby allowing directors, photographers, audio crew, and/or cast to focus on the artistic aspects of the production and minimizing unnecessary repeated shootings caused by lack of coordination or mistakes.

In one example aspect, an automated production system is disclosed to include a directing server configured to store production-stage information in a machine-readable script and to control production of a multimedia content according to the machine-readable script, and a device management server configured to coordinate one or more shooting locations for the production of the multimedia content. The device management server is in communication with, and configured to receive a portion of the production-stage information extracted from the machine-readable script based on a location of the device management server. The system further includes end devices in communication with the device management server and configured to operate under control of the device management server. At least one of the end devices is configured to capture audio or video data at a production time of the multimedia content. The device management server is configured to, in addition to controlling operations of the end devices, track activities of the multiple devices and to provide status of the multiple devices at a production time to the directing server to enable the directing server to dynamically update the machine-readable script for subsequent shooting activities at the production time.

In another example aspect, a method of producing a multimedia content is disclosed. The method includes receiving, by a device management system from a directing server that is configured to store production-stage information in a machine-readable script and manage production of a multimedia content according to the machine-readable script, a portion of production-stage information extracted from the machine-readable script. The method includes determining, by the device management system based on the portion of the production-stage information, one or more operations to be performed by a device at a production time. The method also includes controlling the device by the device management system to perform the one or more operations based on the determining and reporting, by the device management system, status of the device at the production time to the directing server to enable the directing server to dynamically update the machine-readable script for subsequent shooting activities.

These, and other, aspects are described in the present document.

DETAILED DESCRIPTION

Figure 1:
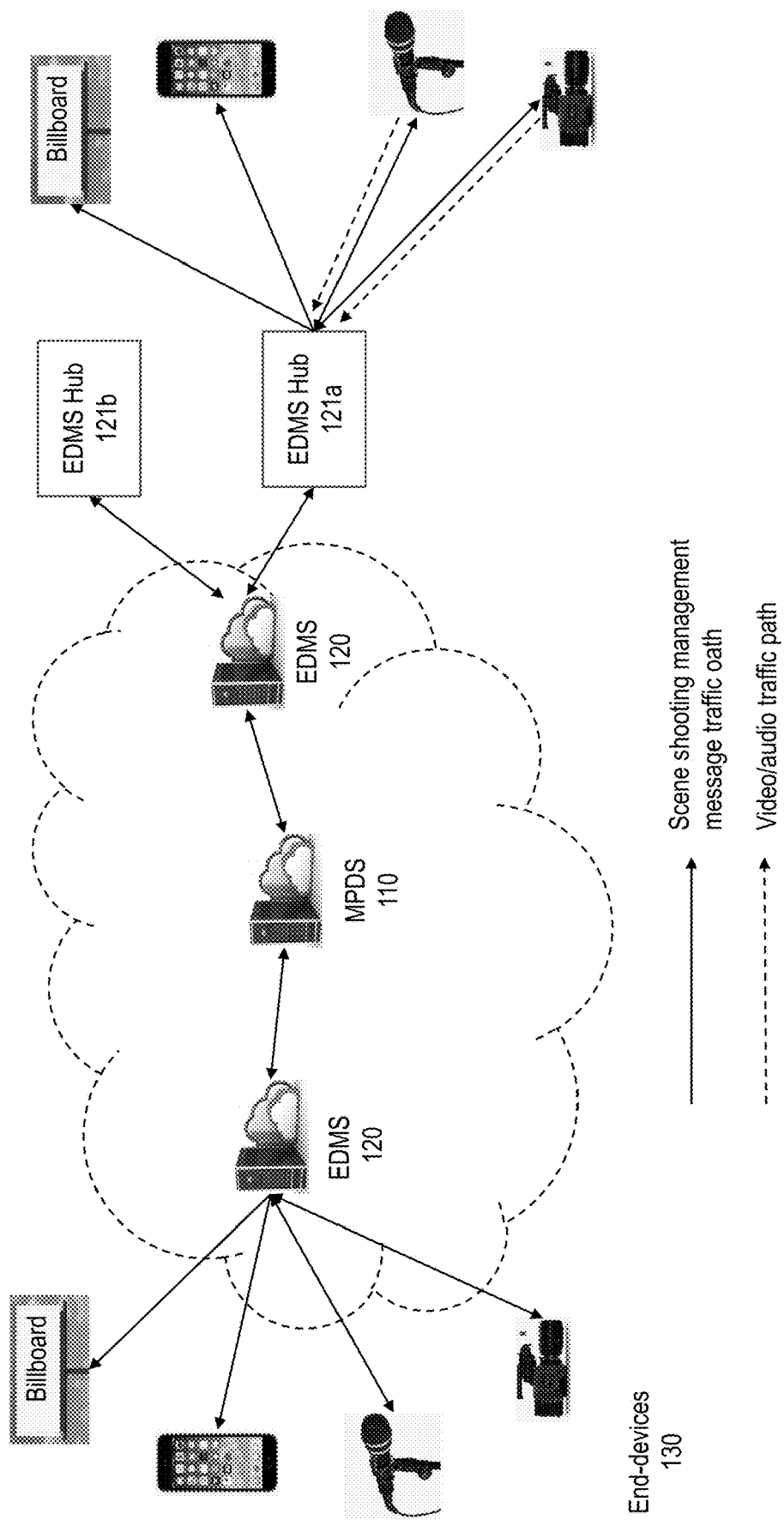
FIG. 1 illustrates an example of a production system adopting the automated coordination techniques in accordance with one or more embodiments of the present technology.

Modern content production often involves intricate coordination of a large number of production devices, cast, and staff members of various production teams. Even after meticulous pre-production stage planning, the coordination and management of different entities at the production stage may still remain complex and challenging. Production-stage shooting can be chaotic at times when organizing and coordinating of various activities and equipment are mostly performed in a manual fashion. As a result, scenes may be shot repetitively, causing additional production delays and added costs. While some of the repeats may be made to achieve certain artistic objectives or goals, many repeats may be caused by errors in manual operations of the production equipment (e.g., device synchronization is not performed properly) and in manually managing the devices or personnel (e.g., positioning of the equipment does not follow the script, cast is not notified of the correct scene location). Such repetitive shootings often lead to unnecessary delays and increase production costs, making it increasingly difficult to stay within the planned production time and cost budgets for production.

This patent document discloses techniques that can be implemented as an automated and cloud-based coordination production service that facilitates the production organization and coordination of various production devices and personnel at the production stage. This coordination service can be implemented as a standalone service adopted in conventional production settings. Alternatively, this coordination service can be implemented as an integral part of an automated Production-as-a-Service System configured to perform automated pre-production, production, and post-production of a multimedia content. Various automated Production-as-a-Service System designs can be used to integrated this automated and cloud-based coordination production service and one example is a Production-as-a-Service System as described in Applicant's issued U.S. Pat. No. 10,721,377 entitled "Production-as-a-service systems for making movies, TV shows and multimedia contents" that was filed on Jul. 19, 2019 and granted on Jul. 21, 2020, the entire disclosure of which is incorporated by reference as part of the disclosure of this document. In implementations, the automated and cloud-based coordination service disclosed herein can be used to greatly reduce the number of unnecessary shooting repeats caused by inefficient coordination of or errors in the personnel or asynchronous behaviors of the devices, thereby allowing directors, photographers and other equipment operators, and/or cast to focus on the artistic aspects of the production. The coordination service can also be used to help reduce production cost and keep production timeline in control. For live broadcast or real-time multimedia content production, the coordination service can be a quintessential part to ensure that all entities can work seamless together.

FIG. 1 illustrates an example of a production system 100 adopting the automated coordination techniques in accordance with one or more embodiments of the present technology. The production system 100 includes the following main components:

Movie Production Directing Server (MPDS) 110: The coordination service can include a directing server, referred to as MPDS, that resides in network cloud. The MPDS can be configured to manage the positions and/or functions of the entities according to a machine-readable script including information about the production and/or post-production of the multi-media content.

End-Device Management System (EDMS) 120: The EDMS can be implemented as a proxy server that receives instructions from MPDS and relay the instructions to all end devices and personnel during the production time. The EDMS is often located close to the end devices to reduce unnecessary or undesired network delays and to enable real-time or near real-time processing and performance. Each EDMS 120 may be implemented to include one or more device management servers to perform EDMS functions. In some embodiments, one EDMS can be connected to multiple EDMS hubs 121*a*, 121*b* to manage multiple shooting scenes located in proximity to each other.

Network-Connected End-devices 130: End-devices can include all types of capturing devices and/or props that are used in the production stage, such as cameras, audio recording devices, dollies, cranes, smart phones, teleprompters, billboards, etc. To allow the EDMS to manage and control the devices, the devices are connected to a network to enable communications between the devices and the servers of the coordination service.

Communication Protocol: A communication protocol is established between the MPDS and the EDMS, and between the EDMS and the end devices to provide efficient communications over network connections or communication channels. In some embodiments, the connections adopt the same protocol to achieve inter-vendor compatibility.

Details about theses components are further discussed below.

Movie Production Directing Server (MPDS)

The MPDS is a directing server that serves as a role similar to that of a director and various functions of the director in production stage—it stores portions of or all the relevant production-stage information and is the brain that manages various production activities. Specifically, for computer-aided multimedia shooting, the MPDS stores information about the scenes/shots in a machine-readable script. In some embodiments, the machine-readable script can have a structured format, such as the Extensible Markup Language (XML) schema. Table 1 shows an example script that is stored by the MPDS, with information about the scenes and shots in each scene.

TABLE 1

Example Script Stored by the MPDS

```
<title>Forrest Gump</title>
<Production Year>1995</ Production Year>
<Director>Eric Roth</Director>
...
<scene id=1>
    <movietime>00:00:01</movietime>
    <duration unit=minute>5</duration>
    <location>
        <city>San Mateo</city>
        <latitude>120000</latitude>
        <longitude>120000</ longitude>
        <indoor outdoor>indoor</indoor_outdoor>
        <address>...</address>
    </location>
    <time>
        <shooting_date>04/03/2019</shooting date>
        <day night>day</day_night>
    </time>
    <staff>
        <director>John Doe</director>
        <photographers>
            ...
        </photographers>
        ...
    </staff>
    <casts>
        <actor>Forrest</actor>
        <actress>Jenny</actress>
        ...
    </casts>
    <cameras>
        ...
    </cameras>
    <vehicles>
        ...
    </vehicles>
    <shot id=1>
        <camera id=1>
            <shot type>close-up shot</shot_type>
            <direction>Forrest/left</direction>
            <angle>horizontal</angle>
        </camera>
        <camera id=2>
            <shot type>close-up shot</shot_type>
            <direction>Jenny/right</direction>
            <angle>horizontal</angle>
        </camera>
        <camera id=3>
            <shot type>media shot</shot_type>
            <direction>Forrest/Jenny/front</direction>
            <angle>horizontal</angle>
        </camera>
        <cut type='jump'>camera 3</cut>
        <action id=1 lapse=55>Forrest and Jenny talking</action>
        <cut type='jump'>camera 2</cut>
        <line speaker='Forrest'>How are you doing? </line>
        <music>
            <id>10</id>
            <type>romantic</type>
            <action>play</action>
```

TABLE 1-continued

Example Script Stored by the MPDS

```
      </music>
    </shot>
    ...
  </scene>
  <scene id=2>
    <movietime>00:05:01</movietime>
    <duration unit=minute>10</duration>
    ...
  </scene>
  <scene id=3>
    <movietime>00:15:01</movietime>
    <duration unit=second>24</duration>
    ...
  </scene>
  <scene id=34>
    <movietime>00:15:25</movietime>
    <duration unit=minute>15</duration>
    ...
  </scene>
  <scene id=5>
    <transition>fade in</transition>
    <movietime>00:30:25</movietime>
    <duration unit=minute>15</duration>
    <location>
      <city>San Francisco</city>
      <latitude>120000</latitude>
      <longitude>120000</ longitude>
      <indoor_outdoor>outdoor</indoor_outdoor>
      <address>...</address>
    </location>
    <time>
      <shooting date>04/05/2019</shooting date>
      <day_night>day</day night>
    </time>
    <staff>
      <director>John Doe</director>
      <photographers>
        ...
      </photographers>
      ...
    </staff>
    <casts>
      <actor>Forrest</actor>
      <actress>Jenny</actress>
      ...
    </casts>
    <commercials>
      <commercial id=1>
        <type>billboard</type>
        <shape>rectangle</shape>
        <pattern>black-white-grid</pattern>
        <commercial id=1>
        ...
    </commercials>
    <cameras>
      ...
    </cameras>
    <vehicles>
      ...
    </vehicles>
    <shot id=1>
      <camera id=1>
        <shot_type>close-up shot</shot_type>
        <direction>Forrest/right</direction>
        <angle>horizontal</angle>
      </camera>
      <camera id=2>
        <shot_type>close-up shot</shot_type>
        <direction>Jenny/left</direction>
        <angle>horizontal</angle>
      </camera>
      <camera id=3>
        <shot_type>media shot</shot_type>
        <direction>Forrest/Jenny/front</direction>
        <angle>horizontal</angle>
      </camera>
      <cut type='jump'>camera 3</cut>
      <action id=1 lapse=5s>Forrest and Jenny walking forward</action>
```

TABLE 1-continued

Example Script Stored by the MPDS

```
      <cut type='jump'>camera 2</cut>
      <line speaker='Forrest'>Which college are you going</line>
      <music>
        <id>12</id>
        <type>romantic</type>
        <action>play</action>
      </music>
      <cut type='match'>camera 3</cut>
      <action id=2>Jenny turned to Forrest</action>
      <line speaker='Jenny'?+0I am going to DC to protest</line>
      <action id=3 lapse=40s>Forrest and Jenny walk in silence</action>
      <cut type='jump'>camera 1</cut>
      <music>
        <action>stop</action>
      </music>
    </shot>
    ...
    <shot id=2>
    </shot>
    ...
    <shot id=3>
    </shot>
    <transition>dissolve</transition>
  </scene>
  ...
```

During the production/shooting time, the MPDS transmits relevant information to one or more EDMS based on locational information provided by the EDMS to control the operations of the devices at the corresponding shooting locations. The MPDS also receives updates from the EDMS so that it can make adjustment to the script accordingly (e.g., the start time and/or duration of each shot and scene). Based on the real-time feedback received from the EDMS, the MPDS can dynamically update the script to allow adjustments of subsequent shootings according to the dependencies among the scene locations, devices, and staff. Such dynamic updates allow automated and seamless transitions between the shooting activities and the scenes.

For production of each multimedia content, there is usually one designated MPDS functioning as the central server to manage various activities. For example, the MPDS is responsible for all the dynamic updates of the scene information so that it can help control the devices at each shooting location and facilitate the coordination between different EDMSs positioned in different locations. Alternatively, or in addition, each EDMS can coordinate the end devices that it is in charge at the production time and provide updates to the MPDS. The updates to the MPDS allow the MPDS to dynamically adjust activities for subsequent shootings. In some embodiments, a fail-over standby MPDS can also be provided to increase robustness of the system and to ensure reliable production of the content (e.g., particularly for real-time broadcast or production).

End-Device Management System (EDMS)

To reduce and/or minimize network delays, the EDMS may include different EDMS servers that can be deployed across different shooting locations to provide real-time control of operations or functions of end devices during the production time. In some embodiments, an EDMS server or a device management server can be implemented as a proxy server that is located physically close to the shooting location. For example, as shown in the script of Table 1, one of the shooting locations is in San Francisco. One or more EDMS servers can be deployed close to the production location in San Francisco. After deployment, an EDMS server sends its location information to the MPDS to retrieve relevant information of one or more scenes that are to be shot at San Francisco. In some embodiments, the EDMS server can transmit a request to the MPDS, where the request includes information about the EDMS (e.g., EDMS identifier and/or location of the EDMS). Based on the provided information, the MPDS can extract the information that is applicable to the particular shooting location(s) and transmit only the relevant portion to the EDMS. Below is an example of scene shooting data that can be transmitted from the MPDS to the EDMS for a particular shooting location (e.g., San Francisco).

TABLE 2

Example Script Retrieved by the EDMS

```
<scene id=5>
  <transition>fade in</transition>
  <movietime>00:30:25</movietime>
  <duration unit=minute>15</duration>
  <location>
    <city>San Francisco</city>
    <latitude>120000</latitude>
    <longitude>120000</ longitude>
    <indoor_outdoor>outdoor</indoor_outdoor>
    <address>...</address>
  </location>
  <time>
    <shooting_date>04/05/2019</shooting date>
    <day_night>day</day_night>
  </time>
  <staff>
    <director>John Doe</director>
    <photographers>
      ...
    </photographers>
    ...
  </staff>
  <casts>
    <actor>Forrest</actor>
    <actress>Jenny</actress>
    ...
  </casts>
  <commercials>
    <commercial id=1>
      <type>billboard</type>
      <shape>rectangle</shape>
      <pattern>black-white-grid</pattern>
      <commercial id=1>
      ...
  </commercials>
  <cameras>
    ...
  </cameras>
  <vehicles>
    ...
  </vehicles>
  <shot id=1>
    <camera id=1>
      <shot type>close-up shot</shot_type>
      <direction>Forrest/right</direction>
      <angle>horizontal</angle>
    </camera>
    <camera id=2>
      <shot type>close-up shot</shot_type>
      <direction>Jenny/left</direction>
      <angle>horizontal</angle>
    </camera>
    <camera id=3>
      <shot type>media shot</shot_type>
      <direction>Forrest/Jenny/front</direction>
      <angle>horizontal</angle>
    </camera>
    <cut type='jump'>camera 3</cut>
    <action id=1 lapse=5s>Forrest and Jenny walking forward</action>
    <cut type='jump'>camera 2</cut>
    <line speaker='Forrest'>Which college are you going</line>
    <music>
      <id>12</id>
      <type>romantic</type>
```

TABLE 2-continued

Example Script Retrieved by the EDMS

```
      <action>play</action>
    </music>
    <cut type='match'>camera 3</cut>
    <action id=2>Jenny turned to Forrest</action>
    <line speaker='Jenny'>?+0I am going to DC to protest</line>
    <action id=3 lapse=40s>Forrest and Jenny walk in silence</action>
    <cut type='jump'>camera 1</cut>
    <music>
      <action>stop</action>
    </music>
  </shot>
  ...
  <shot id=2>
  </shot>
  ...
  <shot id=3>
  </shot>
  <transition>dissolve</transition>
</scene>
```

When the EDMS retrieves the relevant information from the MPDS, the EDMS can determine how many end devices are needed for the production of the particular scene(s). The EDMS can transmit probe or paging messages to the end devices to make sure that the end devices are registered and connected at the production time. Alternatively, or in addition, each device can actively communicate with the EDMS after it is turned on so that the device can be registered and/or authenticated to perform subsequent operations.

After the EDMS obtains information about the devices and personnel based on the information retrieved from the MPDS, the EDMS first synchronize various production devices to the exact time for the production of the contents. Typically, an accuracy within a video frame (25/30 frame/second) is used. In some implementations, the Network Timing Protocol (NTP) can be used for the synchronization purposes. Once various production devices are synchronized, the EDMS sends instructions to the end devices and/or personnel informing them the actions that can be taken. For example, the EDMS can display messages on a billboard to prompt the actor(s)/actress(es) about the lines of the shot(s). As another example, the EDMS can control the orientation and/or angle of a camera based on the script (e.g., as shown in Table 2). The EDMS can also drive movement of the devices (e.g., along a camera dolly track) to ensure that the positions of the device are appropriate for the shot. While the devices are performing these operations, the EDMS collects device status and tracks the timestamps for different production activities. The EDMS then compiles and reports the tracked activities and associated timestamps to the MPDS to facilitate operations in the later production activities.

In some embodiments, the EDMS can be connected to multiple hubs (121a, 121b as shown in FIG. 1) to manage devices and personnel in multiple shooting locations at the same time. Each hub is in charge of a shooting location, and the hubs can locate relatively close to each other. The EDMS distributes information to each hub, and the information from different hubs is consolidated by the EDMS before reporting to the MPDS. In some embodiments, each hub is responsible for communications with the EDMS and with various end devices in the particular position. As shown in FIG. 1, the end devices can be connected to the hub device via a low-power, low coverage-level, and/or short-range communication protocol (e.g., Wi-Fi or Bluetooth), thereby reducing power consumption and network signaling overhead of the end devices.

In some embodiments, some end devices may be shared across different locations managed by different hubs of the same EDMS. The EDMS can help coordinate the movement of the shared devices between shooting locations. For example, the EDMS can obtain the current location of an end device and control the movement or operations of the end device from one hub to another (e.g., by notifying the relevant staff or personnel to transport the device).

Figure 2:
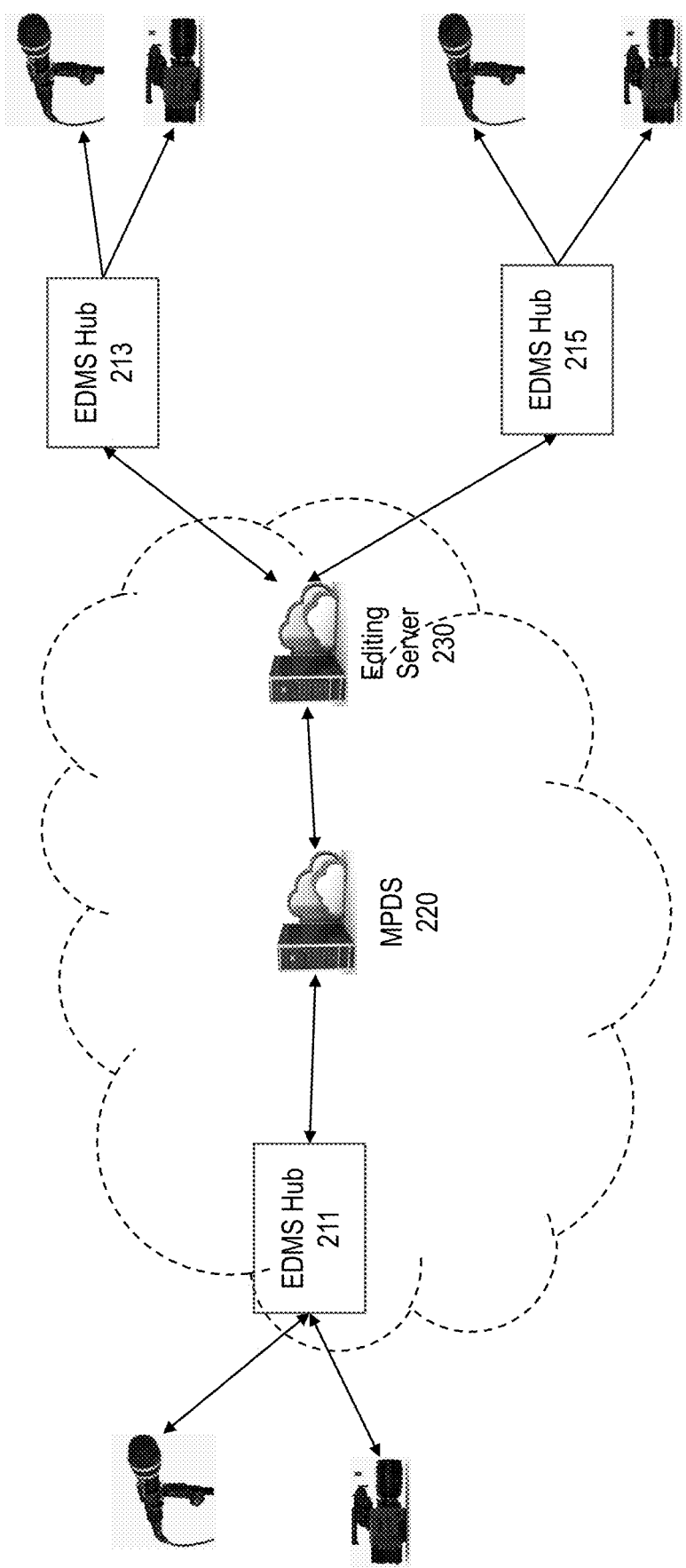
FIG. 2 illustrates example deployments of End-Device Management System (EDMS) hubs in accordance with one or more embodiments of the present technology.

In some embodiments, each hub can provide editing and transcoding functions. For example, each hub can include a graphical user interface so that users can manage the configurations and settings for multimedia content editing. As shown in FIG. 2, one or more EDMS hubs 211 can be deployed at the same shooting location. When the one or more EDMS hubs are deployed at the same location, full editing can be performed locally by the hub(s) as there is no need for cross-location synchronization between the produced content. The edited and/or encoded content is then uploaded to another editing server 230 in the network. In some embodiments, several hubs 213, 215 are deployed across different shooting locations. Each of the hubs can either upload the raw footage to the central editing server 230 for synchronization and subsequent editing, or perform a small set of editing operations before uploading the footage to the central server 230 for synchronization and combination of the footages.

In some embodiments, the EMDS also controls the end devices media encoding. For example, for real-time broadcast or production of multimedia contents, network bandwidth needs to be taken into account as higher frame rates leads to higher network demand. The MPDS can configure encoding setting on the end devices based on MPDS instructions (e.g., as indicated in the machine-readable script). For example, contents from the end devices can be streamed to an EDMS hub that have the processing power for multimedia transcoding. The EDMS hub performs transcoding to the contents to reduce data size, and transmits the transcoded content to the EMDS, thereby reducing network transmission load and ensuring real-time transmissions of the media files.

During the production time, the EMDS also sends shooting status back to MPDS, indicating whether a particular shot is performed according to the script or whether an exception has occurred. For example, the EMDS can transmit the actual shooting time of each shot back to the MPDS to allow dynamic updates of subsequent shooting activities. In some embodiments, the EMDS can perform dynamic updates of multiple shots and/or scenes that occur at the same shooting location, and transmit the updated information to the MPDS to reduce transmission overhead. Table 3 shows an example shooting status report sent from the EDMS to the MPDS.

TABLE 3

Example Status Report from the EDMS

```
<scene id=5>
  <shot id=1>
  <status>Pass</status>
  <duration>1:30</duration>
  </shot>
  <shot id=2>
  <status>Fail</status>
  <reason>code 2</reason>
  <description>Camera 2 is not connected to server</description>
  </shot>
  ...
</scene>
```

Network-Connected End-Device

Conventional content production devices are operated manually by people. To allow local or remote servers to control the operations of these production devices, the end devices can be connected to a local network or the Internet to enable network communications between the end-devices and the server(s) so that operations of the devices are fully controlled by the EDMS.

As discussed above, once a device is turned on and connected to the network, it can actively send a registration request to the EDMS so that it is registered and authenticated for shooting purposes. Alternatively, or in addition, the end device can listen to a probe message or a paging message from the EDMS to prompt it for registrations. The registration request can include information about the device (e.g., device identifier, location of the device). Once a device is registered, the coordination service can send commands to the device and/or to receive status or feedback from the device. For example, a network-capable camera is connected to a Long-Term Evolution (LTE) or a Fifth-Generation (5G) network. The camera includes a display screen to show instructions it receives from the EDMS. The camera can be manually turned on and/or off by a staff member. Alternatively, or in addition, the camera can be in an idle state when it is not in use and be waken up by the probe or paging message from the EDMS at the shooting time. The end device, regardless of whether it is in the idle state or the connected state, can send the status periodically to the EDMS so that the EDMS is aware of the most recent status of the device.

A range of end devices and their operations or functions can be controlled by the EDMS to facilitate automated shooting in the production stage. Here are some sample end devices:

1. Central Information Distribution Device. A central information display device can be used to display key information about the shooting to facilitate coordination of the personnel. For example, a large billboard visible to all or part of the production personnel can be positioned at the shooting location. In addition to the visual display, audio information (e.g., broadcasting device) can also be used to notify staff or crew of the upcoming changes in shooting.

2. Teleprompter. A teleprompter is connected to the EDMS via the network (e.g., Bluetooth, WiFi, or cellular network). The teleprompter receives lines from the EDMS based on the information in the script to prompt the actor(s) or actress(es) what to speak, thereby reducing the number of repeated shooting caused by missing a line or mis-speaking at the shooting time. For example, a billboard can function as a visual teleprompter. As another example, an ear piece that plays the lines can function as an audio teleprompter.

3. Video or Audio Capturing Device. All capturing devices can be connected to the EDMS so that they can be controlled by the EDMS automatically. As discussed above, the EDMS can control the position and/or orientation of the capturing devices. The EDMS can also determine when capturing should be turned on and/or off according to the information it receives from the MPDS (e.g., as shown in Table 2).

4. Personal devices of staff or cast. The staff members or the cast have the option to register their personal devices with the EDMS so that they can receive information about the shooting arrangement. For example, notifications of any immediate actions that need to be taken during the production stage can be sent to the personal devices of the corresponding staff or cast members.

Communication Protocol

Many aspects, such as efficiency, accuracy, and error tolerance, should be taken into consideration when designing the communication protocol. The communication protocol should also accommodate end devices that have low processing power and small energy capacity. For example, the communication protocol can provide two subsets of protocols: the first subset for direct communications between the end devices and the EDMS server, and the second subset for communications between the end devices and the hub servers. For example, the first subset of the communication protocol can be suitable for cellular network connections (e.g., LTE or 5G communications) while the second subset of the communication protocol can be suitable for shorter-range network connections (e.g., Bluetooth or Wi-Fi based link layer connections).

Furthermore, communications between the EDMS/EDMS hub and the end devices for operations of the end devices impose very different requirements as compared to the video data transmissions from the end devices/EDMS hubs/EDMS to the MPDS. The former requires ultra-reliable low-latency communication to ensure the real-time control and operation of the end devices during shooting time. The latter, on the other hand, requires high bandwidth for speeding data transmissions but is more tolerant of packet loos and/or latency. Therefore, the communication channel between the EDMS/EDMS hub and the end devices for transmitting device control information should be kept separate from the communication channel for transmitting produced multimedia content.

Figure 3A:
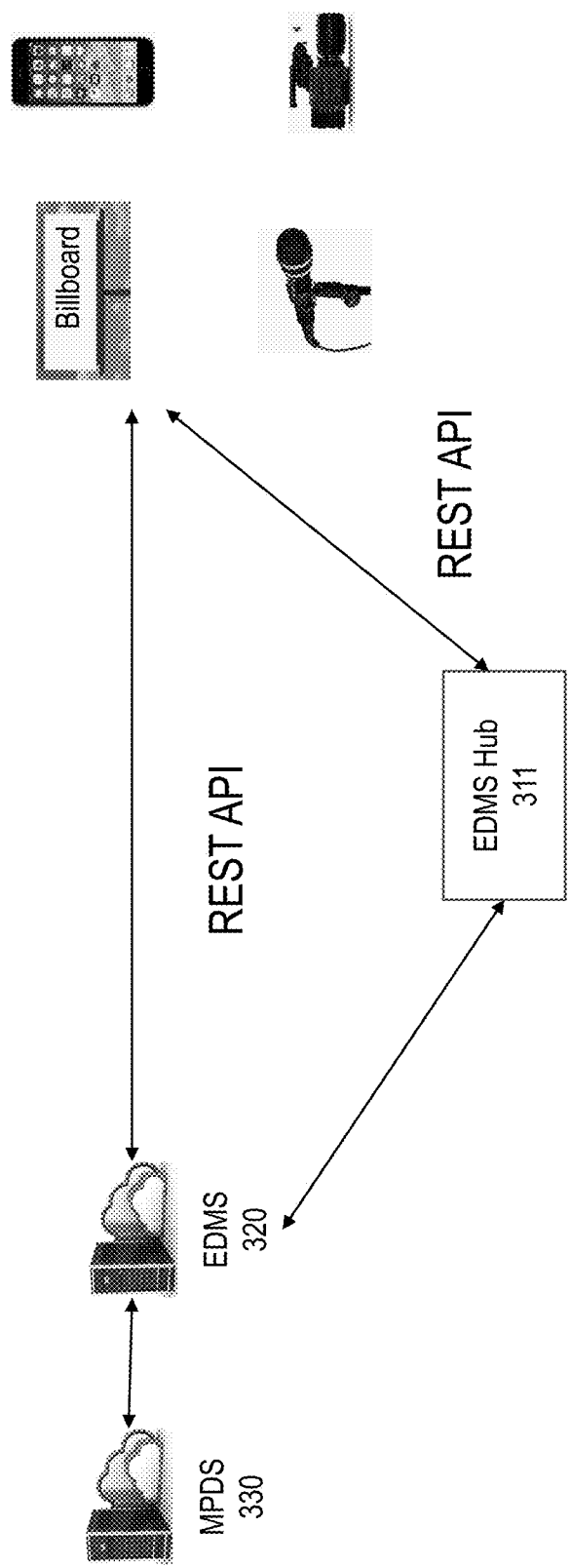
FIG. 3A illustrates an example device management and/or control channel in accordance with one or more embodiments of the present technology.

FIG. 3A illustrates an example device management and/or control channel in accordance with one or more embodiments of the present technology. The MPDS 330, EDMS 320, the EDMS hubs 311, and end devices are typically manufactured by different manufacturers. To ensure compatibility among different servers and devices, the end devices, the EDMS 320/the EDMS hubs 311, and the MPDS 330 can adopt the same communication protocol, such as the Representational State Transfer (REST) application programming interface (API). Using the same communication protocol can minimize or eliminate the need to reconfigure any of the devices once they are registered with the system.

Figure 3B:
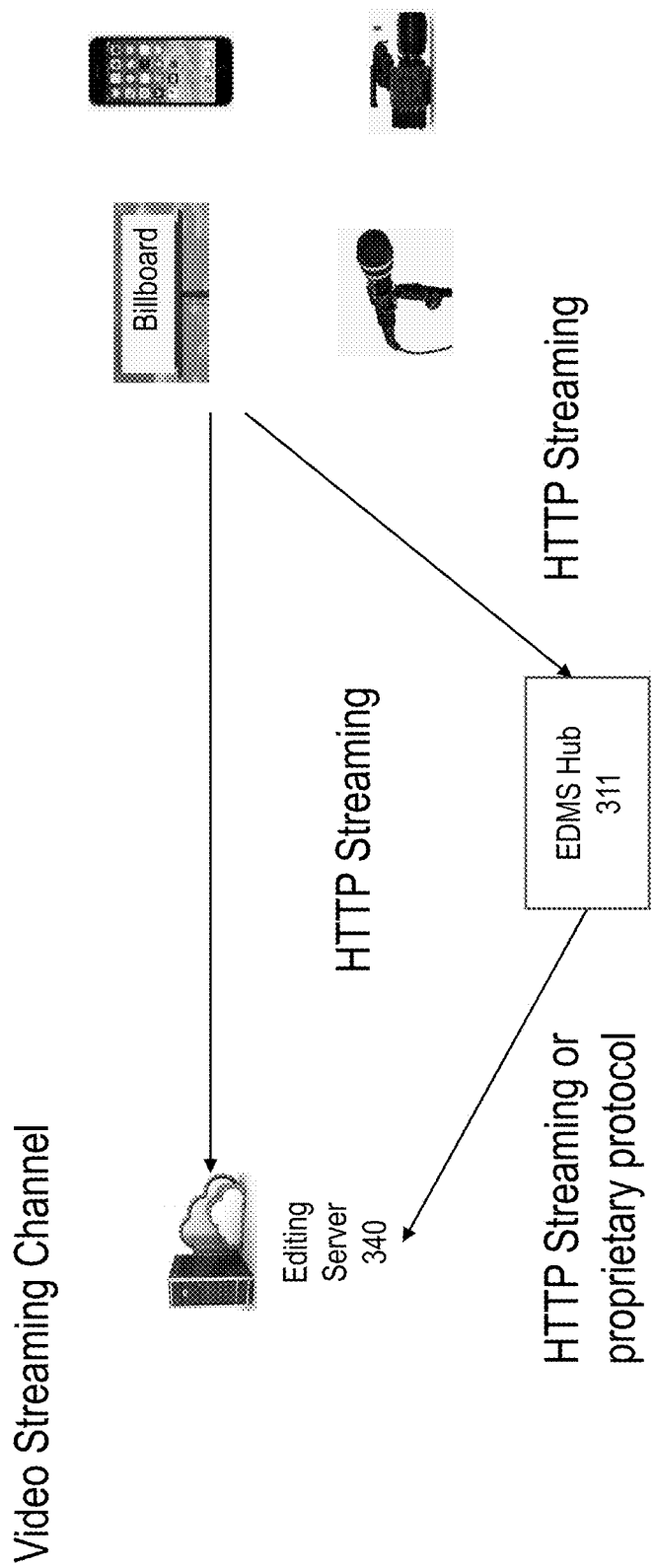
FIG. 3B illustrates an example video stream channel in accordance with one or more embodiments of the present technology.

FIG. 3B illustrates an example video stream channel in accordance with one or more embodiments of the present technology. The protocol between the end devices and the EDMS hubs 311 can be the same as the editing server 340, the EDMS hubs 311, and end devices are often manufactured by different manufacturers. For example, the Hypertext Transfer Protocol (HTTP) streaming API can be used for uploading footages from the end devices to the EDMS hub 311/the editing server 340. Using a common communication protocol can minimize the need to adapt or reconfigure any of the devices once they are registered with the system. The protocol between the EDMS hub 311 and the editing server 340, on the other hand, can adopt different proprietary protocols based on the device types and the network conditions. For example, the EDMS/EDMS hub and the editing server can be connected using a wired network for better bandwidth and faster transmission speed. Proprietary protocols can be used to take advantage of the available resources.

Figure 4:
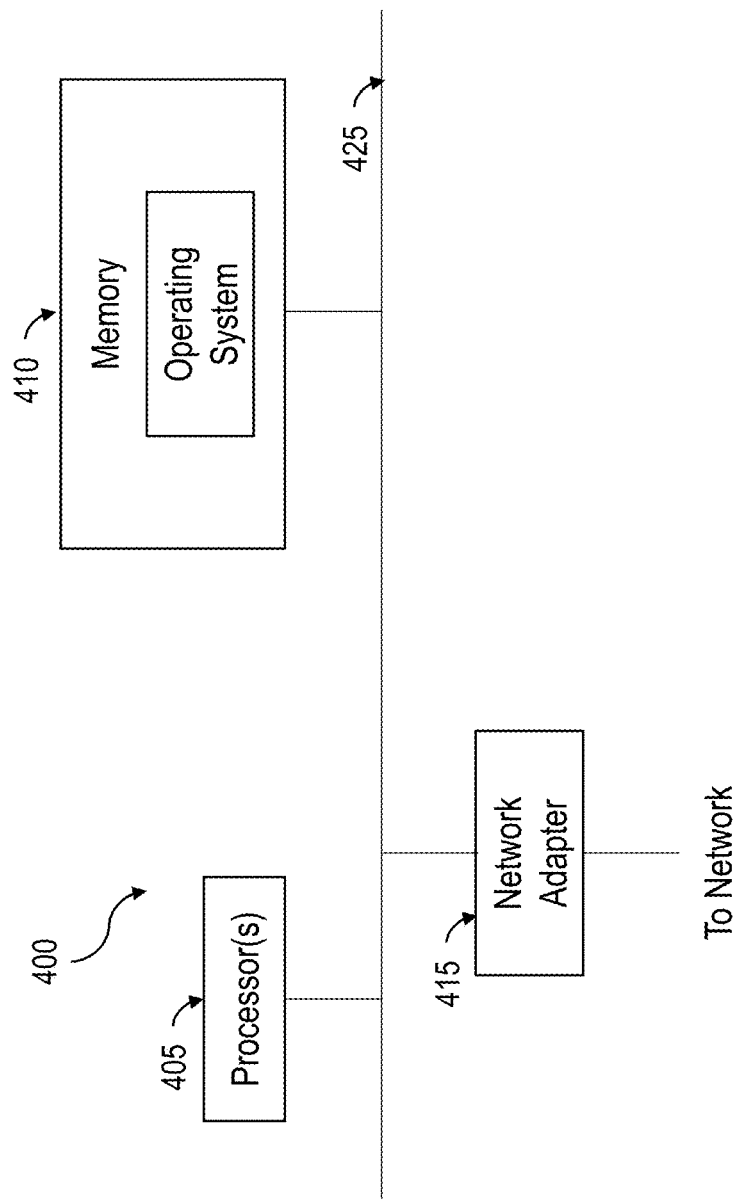
FIG. 4 is a block diagram illustrating an example of the architecture for a computer system or other control device that can be utilized to implement various portions of the presently disclosed technology.

FIG. 4 is a block diagram illustrating an example of the architecture for a computer system or other control device 400 that can be utilized to implement various portions of the presently disclosed technology (e.g., processor(s) to control or perform editing and/or transcoding). The computer system 400 includes one or more processors 405 and memory 410 connected via an interconnect 425. The interconnect 425 may represent any one or more separate physical buses, point to point connections, or both, connected by appropriate bridges, adapters, or controllers. The interconnect 425, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 405 may include central processing units (CPUs) to control the overall operation of, for example, the host computer. In certain embodiments, the processor(s) 405 accomplish this by executing software or firmware stored in memory 410. The processor(s) 405 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 410 can be or include the main memory of the computer system. The memory 410 represents any suitable form of random access memory (RAM), read-only memory (ROM), flash memory, or the like, or a combination of such devices. In use, the memory 410 may contain, among other things, a set of machine instructions which, when executed by processor 405, causes the processor 405 to perform operations to implement embodiments of the presently disclosed technology.

Also connected to the processor(s) 405 through the interconnect 425 is a (optional) network adapter 415. The network adapter 415 provides the computer system 400 with the ability to communicate with remote devices, such as the storage clients, and/or other storage servers, and may be, for example, an Ethernet adapter or Fiber Channel adapter.

Figure 5:
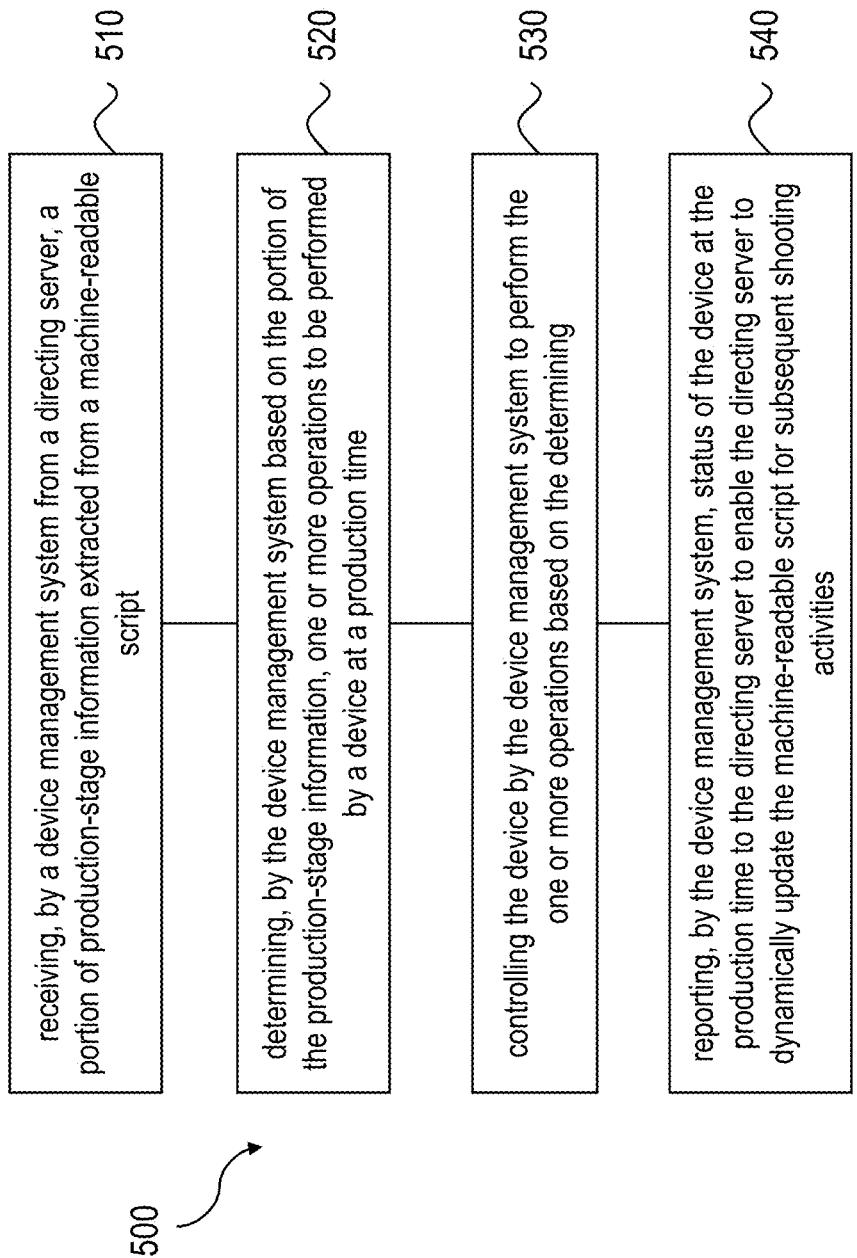
FIG. 5 is a flowchart representation of a method of producing a multimedia content in accordance with one or more embodiments of the present technology.

FIG. 5 is a flowchart representation of a method 500 of producing a multimedia content in accordance with one or more embodiments of the present technology. The method 500 includes, at operation 510, receiving, by a device management system from a directing server that is configured to store production-stage information in a machine-readable script and manage production of a multimedia content according to the machine-readable script, a portion of production-stage information extracted from the machine-readable script. The method 500 includes, at operation 520, determining, by the device management system based on the portion of the production-stage information, one or more operations to be performed by a device at a production time. The method 500 includes, at operation 530, controlling the device by the device management system to perform the one or more operations based on the determining. The method 500 also includes, at operation 540, reporting, by the device management system, status of the device at the production time to the directing server to enable the directing server to dynamically update the machine-readable script for subsequent shooting activities.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses various apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include various forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that various illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An automated production system for producing multimedia contents, comprising:
    a directing server configured to store production-stage information in a machine-readable script, the directing server further configured to control production of a multimedia content according to the machine-readable script;
    a device management server configured to coordinate one or more shooting locations for the production of the multimedia content, wherein the device management server is in communication with, and configured to receive from, the directing server, a portion of the production-stage information extracted from the machine-readable script based on a location of the device management server; and
    end devices in communications with the device management server and configured to operate under control of the device management server, wherein at least one of the end devices is configured to capture audio or video data at a production time of the multimedia content,
    wherein the device management server is configured to, in addition to controlling operations of the end devices, track activities of the end devices and to provide status of the end devices at the production time to the directing server to enable the directing server to dynamically update the machine-readable script for subsequent shooting activities at the production time, and
    wherein the end devices are configured to communicate information associated with the activities or the status with the device management server using a first communication channel, and wherein the end devices are configured to transfer the audio or video data captured during the production time to another server using a second communication channel that is separate from the first communication channel.

2. The system of claim 1, further comprising:
    one or more hub servers connected to the device management server, wherein an individual hub server is connected to at least a subset of the end devices located at a same location.

3. The system of claim 2, wherein the individual hub server is configured to communicate with the subset of the end devices using a short-range communication protocol.

4. The system of claim 2, wherein the individual hub server is configured to:
transcode the audio or video data captured by at least one of the end devices, and
transmit the transcoded audio or video data to the device management server.

5. The system of claim 2, wherein the individual hub server is configured to:
perform one or more editing operations to audio or video data captured by at least one of the end devices; and
transmit the edited audio or video data to a central editing server.

6. The system of claim 2, wherein the subset of the end devices is configured to communicate with the individual hub server using a first protocol for a first communication channel, and wherein the subset of the end devices is configured to communication with another server using a second protocol for a second communication channel, wherein the first protocol is different than the first protocol.

7. The system of claim 1, wherein each of the end devices is configured to:
transmit a registration request to the device management server, wherein the registration request comprising an identifier of the end device; and
provide, upon a successful registration, a status of the end device to the device management server periodically.

8. The system of claim 7, wherein the device management server is configured to trigger the registration request by transmitting a probe message or a paging message to the end device.

9. The system of claim 1, wherein the device management server is configured to synchronize the end devices.

10. The system of claim 1, wherein the device management server is configured to control an operation of at least one of the end devices according to the portion of the production-stage information.

11. The system of claim 10, wherein the device management server is configured to control at least a location or an orientation of the end device.

12. The system of claim 10, wherein the device management server is configured to control the end device to display or broadcast information received from the device management server.

13. The system of claim 1, wherein the end devices include at least one of a central information distribution device, a teleprompter, a multimedia content capturing device, or a personal mobile device of a member participating in the production of the multimedia content.

14. The system of claim 1, wherein a first communication channel between the device management server and the directing server and a second communication channel between the device management server and at least one of the end devices share a same protocol.

15. The system of claim 1, wherein the directing server, the device management server, and the end devices are part of an automate production-as-a-service system configured to perform automated pre-production, production, and post-production of the multimedia content.

16. A method of producing a multimedia content, comprising:
receiving, by a device management system from a directing server, a portion of production-stage information extracted from a machine-readable script, wherein the directing server is configured to store the production-stage information in the machine-readable script, the directing server further configured to control production of the multimedia content according to the machine-readable script;
determining, by the device management system based on a portion of the production-stage information, one or more operations to be performed by an end device at a production time;
controlling the end device by the device management system to perform the one or more operations based on the determining; and
reporting, by the device management system, status of the end device at the production time to the directing server to enable the directing server to dynamically update the machine-readable script for subsequent shooting activities,
wherein the device management system comprises a device management server and one or more hub servers, and the end device is connected to the device management server via one of the one or more hub servers.

17. The method of claim 16, further comprising:
receiving, by the device management system, a registration request from the end device, wherein the registration request comprises an identifier of the end device.

18. The method of claim 17, further comprising:
triggering, by the device management system, the registration request by transmitting a probe message or a paging message to the end device.

19. The method of claim 16, wherein the one of the one or more hub servers is configured to communicate with the end device using a short-range communication protocol.

20. The method of claim 16, comprising:
transcoding, by a hub server of the device management system, audio or video data captured by the end device.

21. The method of claim 16, comprising:
performing, by a hub server of the device management system, one or more editing operation to audio or video data captured by the end device; and
transmitting, by the hub server, the edited audio or video data to a central editing server.

22. The method of claim 16, wherein the end device is configured to communicate with a hub server using a first protocol, and wherein the end device is configured to communication with another server using a second protocol that is different than the first protocol.

23. The method of claim 16, further comprising:
synchronizing the end device with other devices used at the production time by the device management system.

24. The method of claim 16, further comprising:
receiving, by the device management system, a periodic update from the end device indicating the status of the end device.

25. The method of claim 16, wherein the one or more operations to be performed by the end device comprise at least one of: starting to capture audio or video data of a shot, stopping to capture audio or video data of the shot, displaying or broadcasting the portion of the production-stage information, generating a notification about an action to be performed at the production time, or changing a position or an orientation of the end device.

26. The method of claim 16, wherein the end device includes at least one of a central information distribution device, a teleprompter, a multimedia content capturing device, or a personal mobile device of a member participating in the production of the multimedia content.

27. The method of claim 16, comprising:
transmitting or receiving, by the device management system, control information for controlling the end device using a first communication channel, wherein the end device is configured to transfer audio or video data captured during the production time to another server using a second communication channel that is separate from the first communication channel.

28. The method of claim 16, wherein the device management system is part of an automate production-as-a-service system configured to perform automated pre-production, production, and post-production of the multimedia content.

* * * * *